US009771007B2

(12) United States Patent
Shellenberger (10) Patent No.: US 9,771,007 B2
(45) Date of Patent: Sep. 26, 2017

(54) MULTI-POSITION REAR-FACING CHILD SEAT

(71) Applicant: ARTSANA USA, INC., Lancaster, PA (US)

(72) Inventor: Mitchell L. Shellenberger, Mount Joy, PA (US)

(73) Assignee: ARTSANA USA, INC, Lancaster, PA (US)

( * ) Notice: Subject to any disclaimer, the term of this patent is extended or adjusted under 35 U.S.C. 154(b) by 68 days.

(21) Appl. No.: 15/006,210

(22) Filed: Jan. 26, 2016

(65) Prior Publication Data

US 2016/0221480 A1  Aug. 4, 2016

Related U.S. Application Data

(60) Provisional application No. 62/109,338, filed on Jan. 29, 2015.

(51) Int. Cl.
*B60N 2/28* (2006.01)

(52) U.S. Cl.
CPC ......... *B60N 2/2863* (2013.01); *B60N 2/2821* (2013.01); *B60N 2/2845* (2013.01); *B60N 2/2872* (2013.01); *B60N 2/2878* (2013.01)

(58) Field of Classification Search
None
See application file for complete search history.

(56) References Cited

U.S. PATENT DOCUMENTS

| 4,058,342 | A | * | 11/1977 | Ettridge | B60N 2/2821 297/256.13 |
| 4,770,468 | A | * | 9/1988 | Shubin | B60N 2/2821 297/256.15 |
| 4,858,997 | A | * | 8/1989 | Shubin | B60N 2/2821 297/256.13 |
| 5,277,472 | A | * | 1/1994 | Freese | B60N 2/2821 297/130 |
| 5,551,751 | A | | 9/1996 | Sedlack et al. | |
| 6,139,101 | A | | 10/2000 | Berringer et al. | |
| 6,428,099 | B1 | * | 8/2002 | Kain | B60N 2/2806 297/250.1 |
| 6,554,358 | B2 | * | 4/2003 | Kain | B60N 2/2806 297/256.13 |
| 7,325,871 | B2 | | 2/2008 | Gangadharan et al. | |
| 7,472,955 | B2 | * | 1/2009 | Crane | B60N 2/2806 297/250.1 |
| 7,597,396 | B2 | | 10/2009 | Longenecker et al. | |
| 7,625,043 | B2 | * | 12/2009 | Hartenstine | B60N 2/2806 297/250.1 |

(Continued)

*Primary Examiner* — David E Allred
(74) *Attorney, Agent, or Firm* — Patent Law Associates (57) ABSTRACT

A multi-position child safety seat having a base and a separable seat shell supported by the base wherein the base comprises a movable block that alters the angle of the seat shell dependent upon the position of the block and provides for at least two usable positions of the seat shell. The seat shell includes a latching mechanism for securing the seat shell to the base which is operable in any of the at least two positions. The movable block is hingedly connected to the base and preferably movable between two generally opposing positions corresponding to two pre-determined seat shell positions and may include restraint provisions to preclude unintentional movement of the block.

20 Claims, 8 Drawing Sheets

(56) References Cited

U.S. PATENT DOCUMENTS

| | | | |
|---|---|---|---|
| 7,735,921 B2 | 6/2010 | Hutchinson et al. | |
| 8,056,975 B2* | 11/2011 | Longenecker | B60N 2/2806 |
| | | | 297/253 |
| 8,123,295 B2 | 2/2012 | Hutchinson et al. | |
| 8,186,757 B2 | 5/2012 | Duncan et al. | |
| 8,226,164 B2* | 7/2012 | Chen | B60N 2/2821 |
| | | | 297/130 |
| 8,276,988 B2* | 10/2012 | Hartenstine | B60N 2/2821 |
| | | | 297/250.1 |
| 8,353,559 B2 | 1/2013 | Williams et al. | |
| 8,556,344 B2 | 10/2013 | Williams et al. | |
| 8,585,143 B2* | 11/2013 | Xiao | B60N 2/2821 |
| | | | 297/256.13 |
| 9,061,611 B2* | 6/2015 | Love | B60N 2/2887 |

\* cited by examiner

MULTI-POSITION REAR-FACING CHILD SEAT

CROSS REFERENCE TO RELATED APPLICATIONS

This application claims the benefit of priority of U.S. Provisional Application No. 62/109,338, filed Jan. 29, 2015.

BACKGROUND OF THE INVENTION

The present application relates generally to the field of child safety seats. More particularly, the present invention relates to a mounting base for a rear-facing installation of child safety seat in a vehicle that provides an improved means for adjusting the inclination of the seat repositioning to accommodate occupants of different ages and/or sizes.

Many safety organizations recommend that children be seated rear-facing in their car-seats until age 2 or until exceeding the height or weight limits of the car-seat. Predominate rules require children to remain rear-facing until age 1 or 20 lbs. While the optimal point to switch to forward-facing seating is debatable, many people advocate keeping a child in a rear-facing orientation for as long as possible.

Rear-faced child seating often presents a problem of limited legroom, especially for children of above-average height or growth rate. The problem is further compounded as parents seek to use car seats for longer spans in their child's early life and minimize the number of car seats purchased. Certain rear-facing-capable car seats offer design features such as adjustments for shell height, seat depth, recline angle, etc. so that the seat is suitable for higher height and weight limits.

There is a need for a child safety seat for use in a vehicle that provides for easy installation in rear-facing orientations and the capability to be adjusted to accommodate changes in children's size and weight as they grow.

SUMMARY OF THE INVENTION

Accordingly, the present invention, in any of the embodiments described herein, may provide one or more of the following advantages:

According to one embodiment of the present invention, a child safety seat includes a seat shell for holding a small child and a mounting base for securing the seat shell into a vehicle. The mounting base may be secured to the vehicle, preferably in the rear seat, by belts connected to anchors provided in the vehicle. The seat shell is selectively attached to the mounting base using a retention latch to immovably secure the seat shell to the mounting base. The mounting base further includes a selectively moveable positioner means that enables the seat shell to be positioned in one of two rear-facing positions while enabling the retention latch to function in either position.

The mounting base includes a selectively positionable seat block which is hingedly connected to the mounting base. The seat block may be selectively positioned in one of at least two positions, each position of the seat block configuring the mounting base to orient the car seat shell connected thereto in a unique position. The at least two positions correspond to car seat shell positions appropriate for a child of a certain age, with one position preferably being optimized for a child less than 1 year of age and a second position preferably optimized for a child of 1 to 2 years of age wherein additional room is provided between the safety seat and the vehicle seatback for the child's legs. The seat block is configured to engage connection features on the car seat shell in any of the at least two positions and allow a secure connection of the shell to the base.

Another object of the present invention is to provide a mounting base for securing a child safety seat into a vehicle in a rearward-facing orientation and in one of two predetermined positions. A seat block is hingedly connected to the mounting base and positionable in one of at least two positions which define corresponding predetermined seat positions. The extent of the forward-rearward dimensional envelope occupied by the seat and base remains substantially unaffected by moving the seat between the at least two positions.

Another embodiment of the present invention provides an easily adjustable head restraint for the child safety seat that permits adjustment of the seat for children of different sizes without affecting the installation or routing of shoulder harness belts. The seatback includes a headrest portion mounted in a track allowing upward and downward sliding movement. A positioning rack is provided on the seat shell and generally arranged along the sliding movement axis. A lock moveable in a direction perpendicular to the sliding movement axis and connected to the headrest portion form movement therewith along the sliding axis is configured to engage the positioning rack when in one position to inhibit sliding movement of the headrest portion. Movement of the lock away from the first position releases the engagement with the positioning rack and allows sliding movement of the headrest portion. The relation of the shoulder harness belts and the lock is such that increasing tension in the belts generally increases the engagement force of the lock in the positioning rack to improve resistance to movement during events when the shoulder harness is required to restrain the child (e.g., vehicle crashes).

It is a further object of the present invention to provide a multi-position rear facing child safety seat that is durable in construction, inexpensive of manufacture, carefree of maintenance, easily assembled, and simple and effective to use.

These and other objects are achieved in accordance with the instant invention by providing a multi-position child safety seat having a base and a separable seat shell supported by the base wherein the base comprises a movable block that alters the angle of the seat shell dependent upon the position of the block and provides for at least two usable positions of the seat shell. The seat shell includes a latching mechanism for securing the seat shell to the base which is operable in any of the at least two positions. The movable block is hingedly connected to the base and preferably movable between two generally opposing positions corresponding to two pre-determined seat shell positions and may include restraint provisions to preclude unintentional movement of the block.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined from the perspective of an occupant sitting in the seat normally. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring generally to the figures and specifically to FIGS. 1 through 6, there is shown a child safety seat assembly 5 incorporating aspects of the present invention. The safety seat assembly 5 includes a seat shell 10 having an interior infant seating area 12 generally shaped to contain an infant or small child therein. The infant seating area 12 includes a seat bottom 15 with forward seat edge 11 and a back rest 13 upwardly angled from the seat bottom 15 opposite of the forward seat edge 11. A plurality of belts 80 are provided in the seating area to comfortably secure the child to the seat shell 10 during use. The belts 80 are secured to the structure of the seat shell by conventional means and include provisions for adjustment to accommodate occupants of various sizes.

The seat shell 10 may be connected to a base 20 which is configured to enable the seat assembly 5 to be conveniently and securely positioned in a vehicle seat. Anchor belts (not shown) are typically provided to secure the base 20 to the vehicle seat using Lower Anchors and Tethers for Children (LATCH) connectors or safety belts installed in the vehicle. The base 20 and seat shell 10 include a conveniently releasable connection mechanism that permits the seat shell 10 to be conveniently detached from the base 20 while also providing a secure connection when attached.

Soft goods and padding are typically provided for the interior portion to improve comfort and offer pleasing aesthetics. For clarity, soft goods are not shown in the accompanying figures.

As best shown on FIGS. 3 through 6, the seat shell 10 comprises an exterior portion 14 opposite of the interior infant seating area that preferably includes a pair of generally parallel and spaced apart shell supports 16 extending generally fore- and aft along the lowermost extent of the exterior portion. The shell supports 16 support enable the seat shell 10 to rest independently on a generally level surface. The shell supports 16 also interface with the base to guide the seat shell 10 into position as it is being attached to the base and partially support the shell 10 on the base 20. The shell supports 16 may be convexly curved along their lowermost edge to allow the seat shell 10 to rock forward and backward while resting on a level surface detached from the base 20. It is preferable to provide a pair of shell supports 16 as illustrated and include a similarly configured channels 28 in the base 20 to laterally align and restrain the seat shell 10 in the base 20.

The shell supports 16 further comprise a pair of first positioners 17 and a pair of second positioners 18 for aligning the seat shell 10 for connection to a base 20. The first and second positioners 17, 18 may be contoured to establish the precise orientation of the seat shell 10 to the base 20 when connected thereto. The first positioners 17 are configured to guide the seat shell into a first position while the second positioners 18 are configured to the seat shell 10 into a second position when being engaged on the base 20.

Figure 1:
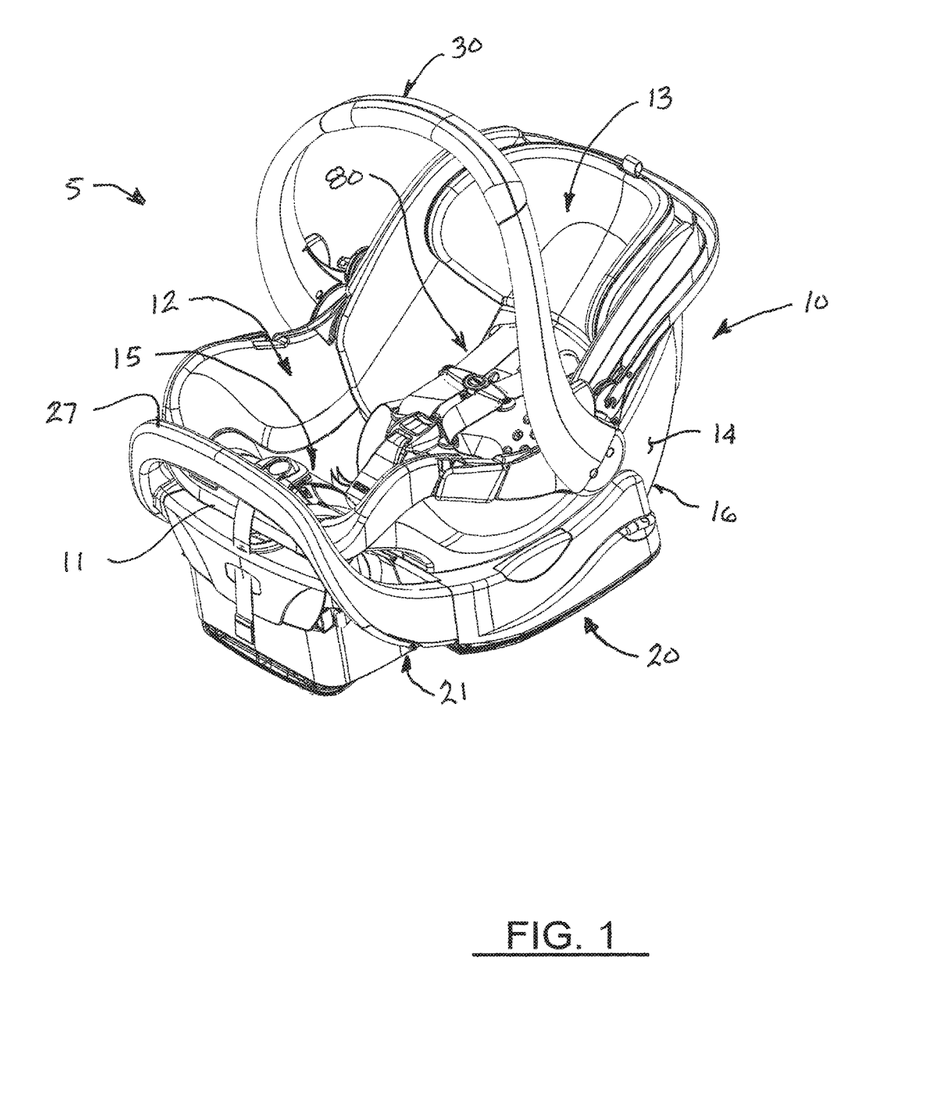
FIG. 1 is a perspective view of a child safety seat assembly of the type on which the present invention is useful, shown in a normal inclination suitable for an infant.
Figure 2:
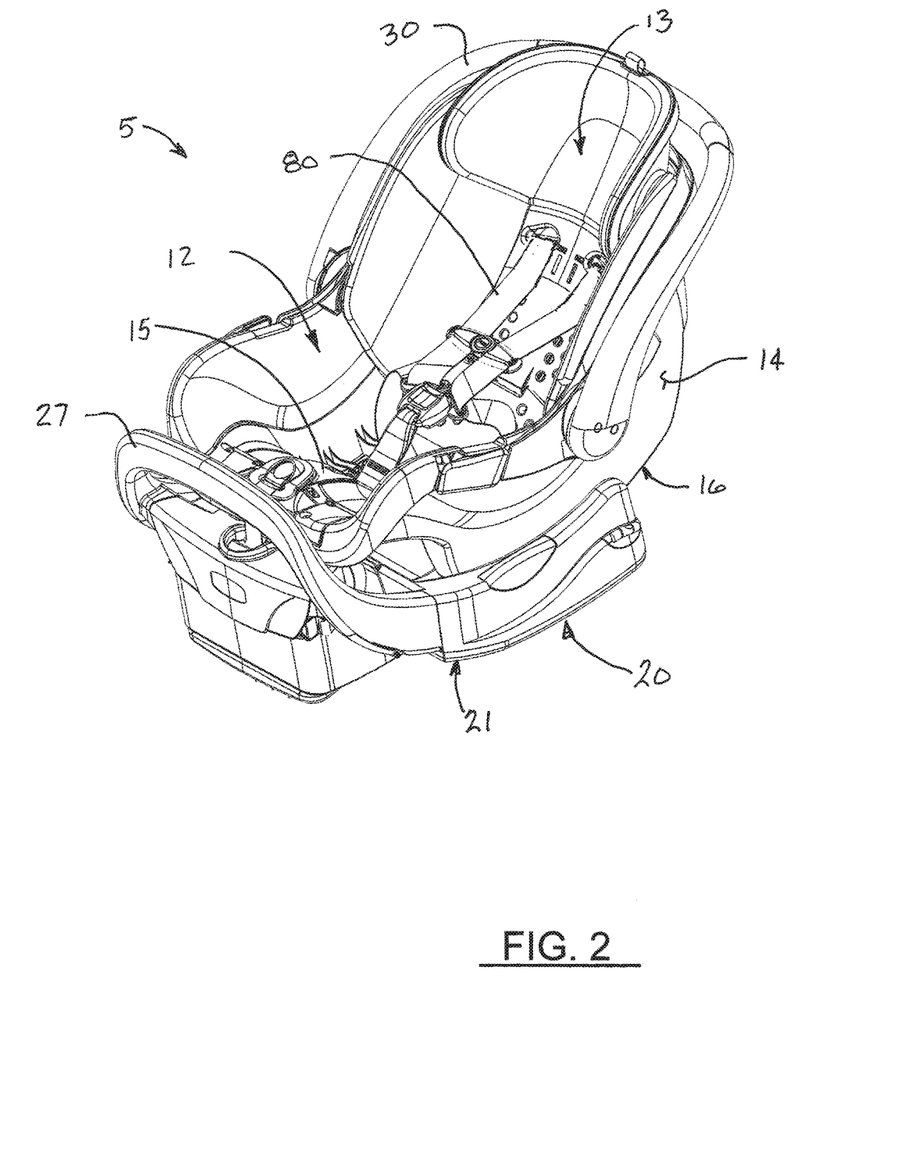
FIG. 2 is a perspective view of the child safety seat assembly of FIG. 1, shown in a less reclined, more upright position suitable for a larger child.
Figure 3:
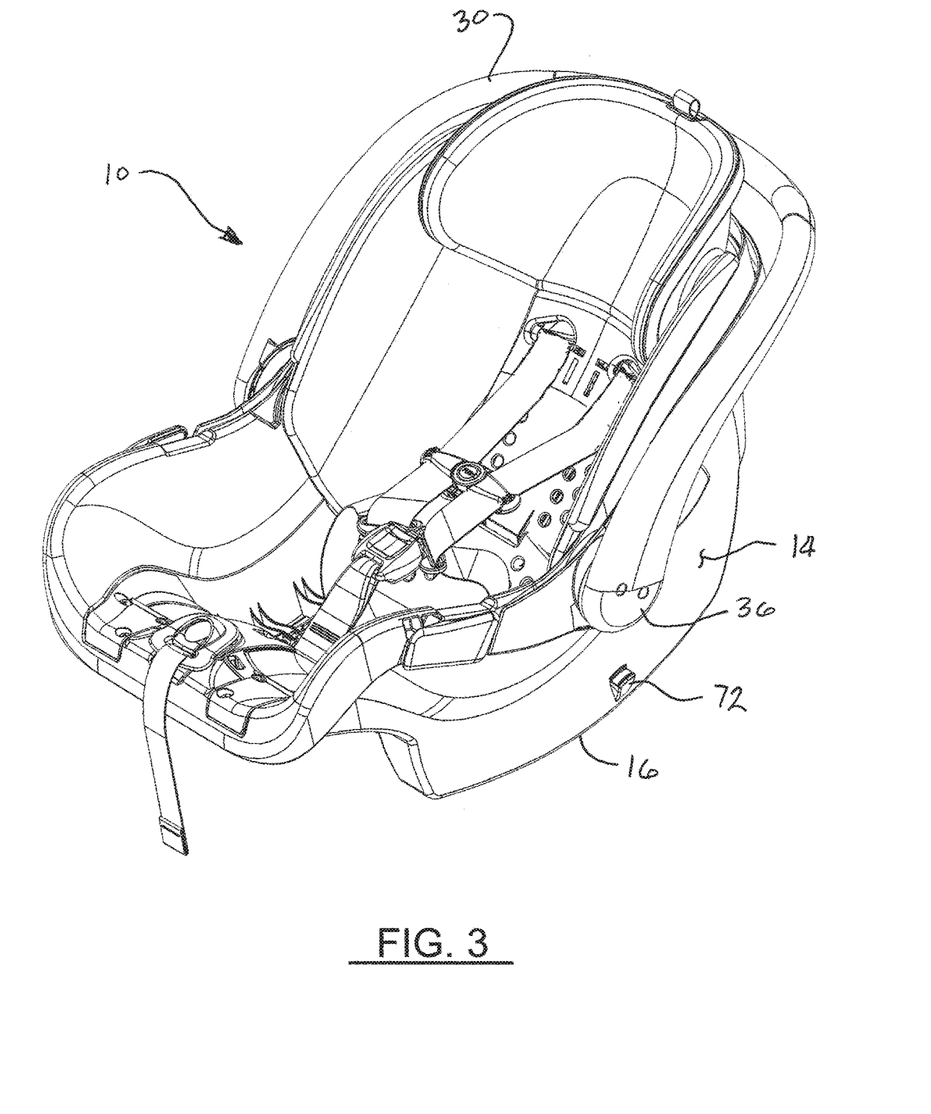
FIG. 3 is perspective view of the seat shell of FIG. 1.
Figure 4:
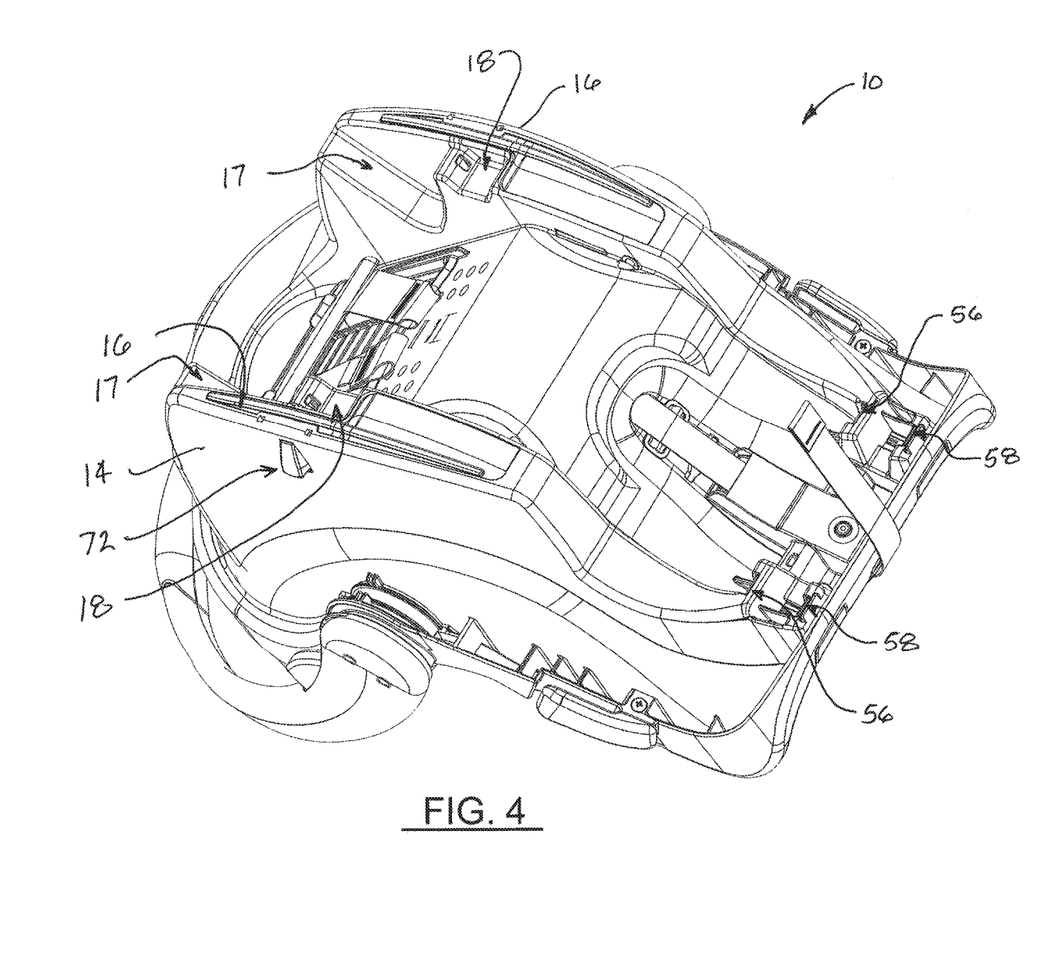
FIG. 4 is an underside view of the seat shell of FIG. 3.
Figure 5:
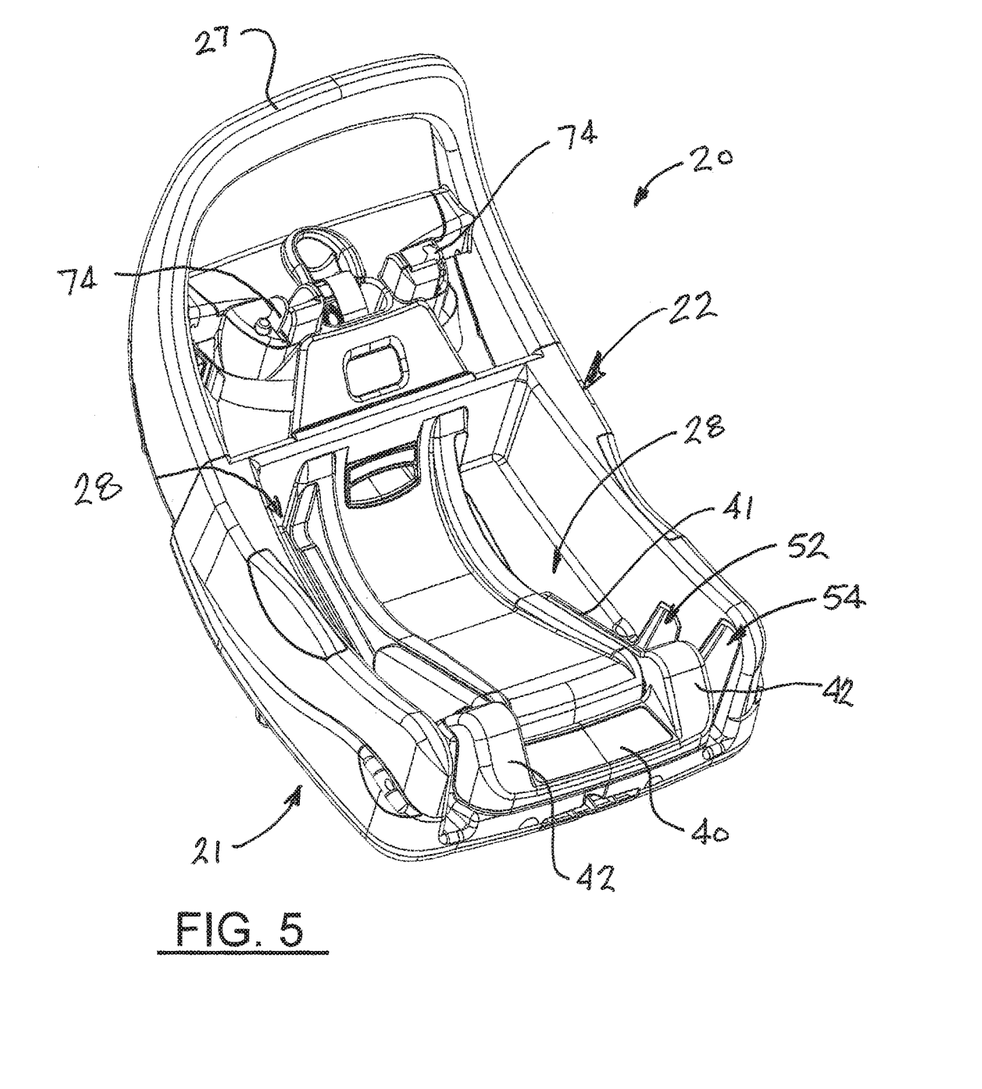
FIG. 5 is a perspective view of the base assembly of the seat assembly of FIG. 1, with the adjustable block shown in a first position.
Figure 6:
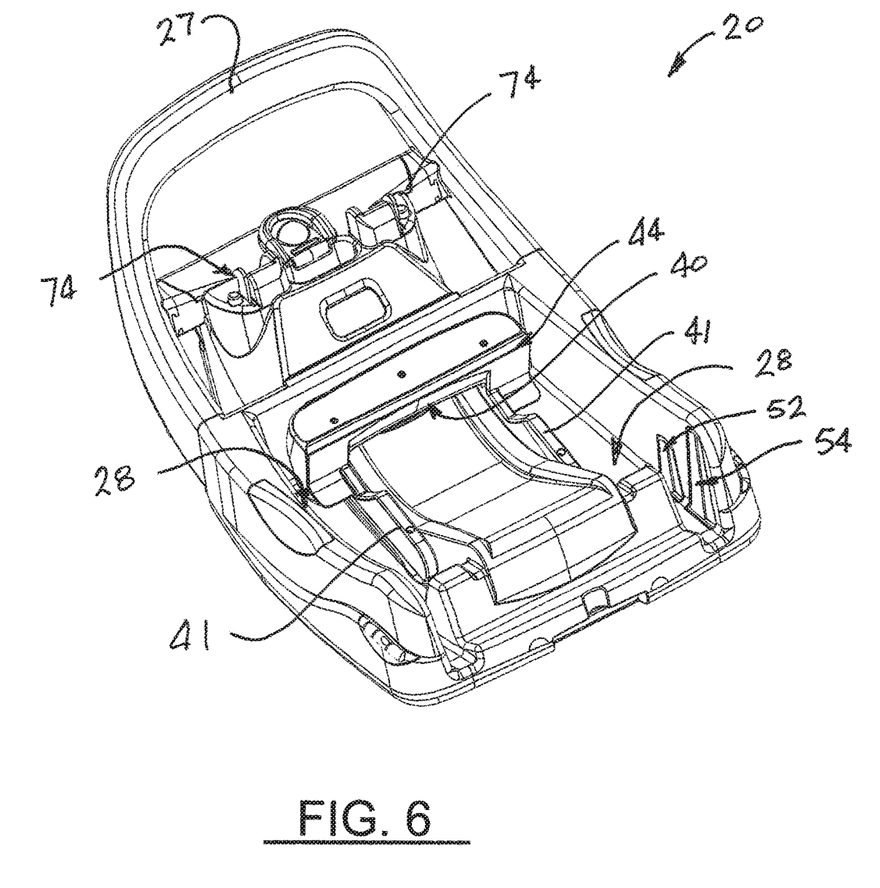
FIG. 6 is a perspective view of the base assembly of the seat assembly of FIG. 2, with the adjustable block shown in a second position.

The base 20 provides a platform for securing the seat shell 10 to a vehicle seat 3 while allowing the seat shell 10 to be conveniently removed from the vehicle. The base comprises a lower surface 21 configured to enable the base to be securely positioned on a vehicle seat. An upper surface 22 generally oppositely disposed from the lower surface is adapted to receive the seat shell 10 therein. A base end 27 may be provided to assist in locating the base 20 in a vehicle seat and to limit seat assembly movement during a vehicle crash. The base end 27 may also coincidentally provide a surface upon which a seat occupant's feet may rest to reduce wear and tear on the vehicle seat surface. A retention mechanism is provided to allow the seat shell 10 to be selectively secured to the base 20. Releasing the retention mechanism permits the seat shell 10 to be removed while the base 20 remains secured to the vehicle seat 3. A handle 30 connected to the seat shell 10 allows the seat shell 10 to be conveniently carried by a user when the seat shell is not connected for use in a vehicle. It is preferable that the handle 30 include a pivoting connection 36 allowing the handle position to be adjusted, generally pivotally about a transverse axis, and a fixing catch 34 be provided to fix the handle 30 in a desired position unless selectively released by a user for adjustment.

Referring specifically to FIGS. 2 through 6, the base 20 includes a moveable seat block 40 which is pivotally coupled to the base 20 by one or more radius arms 41 which allow pivoting movement between a first position, shown in FIG. 5, and an opposing second position, shown in FIG. 6. In one embodiment, the moveable seat block 40 includes an over-center mechanism to bias the seat block 40 in either the first or second position so that a user can easily position the seat block in either of the positions, as desired. Alternatively, the seat block may include a latching mechanism to retain the seat block 40 in either of the first or second positions, or the seat block could simply be allowed to pivot freely. Yet another alternative is to incorporate a sliding apparatus for moving the seat block 40 between the first and second positions which eliminates the pivoting connection and the radius arms.

The seat block 40 interacts with the seat shell 10 to allow the angular orientation of the seat shell 10 to be altered into one of two predetermined angled positions dependent upon the position of the seat block 40. A first position, shown in FIGS. 1 and 7, corresponds to the seat block 40 being in the first position and is optimized for a younger child. In this position, the seat shell 10 is reclined so that a child is generally supinely positioned as is suitable for young infants. The first surfaces 42 on the seat block 40 are configured to be matingly received by the first positioners 17 in the seat shell 10. The interface between the first surfaces 42 and the first positioners establishes positional relationship between the seat shell 10 and the base 20, angling the seat shell into the more reclined position of FIGS. 1 and 7. A second position, shown in FIGS. 2 and 8, corresponds to the seat block 40 being in the second position and is optimized for an older child, such as a small toddler. A second surface 44 on the seat block 40 interacts with the shell supports 16 as the shell is being engaged with the base, causing the seat shell to rotate into the desired position at which point the block 40 will engage the second positioners 18 to restrain the shell from further fore-aft "rocking" movement and a retention mechanism to engage. In the second position, the seat shell 10 is more uprightly positioned compared to the first position to position the child in a more upright manner. The more upright seating position also increases leg room for the child between the seat shell and the vehicle seat back. The moveable seat block 40 and its movement within the base is configured to permit use with current safety seat designs with little or no alteration of the exterior portion 14 of the shell.

The seat shell 10, being moved into a connected position with the base 20, is restrained from further movement by a retention mechanism. The retention mechanism includes at least one of latch engaging one of a plurality of receptacles depending upon the position of the seat block 40, allowing selective attachment of the seat shell to the base in one of two predetermined positions. In the illustrated embodiment, a first latch 72 is provided on the seat shell 10 and a second latch 74 is provided on the base 20. The latches 72, 74 engage respective receptacles when the seat shell is moved into connection with the base. First and second base receptacles 52, 54 are provided on the base for engagement with the first latch 72, dependent upon the seat shell position. It is preferable for latch-receptacle pairs to be provided on each side of the seat shell and base. When the seat shell is being engaged in the first position (FIG. 1), the first latch 72 engages the first base receptacles 52. When the seat shell is being engaged in the second position (FIG. 2), the first latch 72 engages the second base receptacles 54. Similarly, first and second shell receptacles 56, 58 are provided on the seat shell 10 for engagement with the second latch 74 dependent upon the shell position. When the seat shell is being engaged in the first position (FIG. 1), the second latch 74 engages the first shell receptacles 56. When the seat shell is being engaged in the second position (FIG. 2), the second latch 74 engages the second shell receptacles 58. Release mechanisms may be provided permit the latches 72, 74, to be selectively released to disengage the latches from their respective receptacles and thereby permit the seat shell 10 to be detached from the base 20. The retention mechanisms are preferably configured for automatic engagement of the latches into the receptacle as the seat shell is moved into engagement with the base.

In the present invention, the interface between the seat block 40 and the positioners 17, 18 on the lower exterior portion of the seat shell guides the seat shell 10 into one of two preferred orientations which permit engagement of the latches 72, 74 with respective receptacles 52, 54, 56, 58 corresponding to the seat shell orientation and secure the seat shell 10, in either position of the movable block 40, to the base 20. Further, the configuration of the positioners 17, 18 is such that the seat shell may only be engaged and latched with the base in either the first (FIG. 1) or the second (FIG. 2) position dependent upon the position of the seat block 40. Once engaged in the base 20, the seat shell 10 inhibits movement of the seat block 40 and thereby prevents shifting of the seat block between the two positions.

Figure 7:
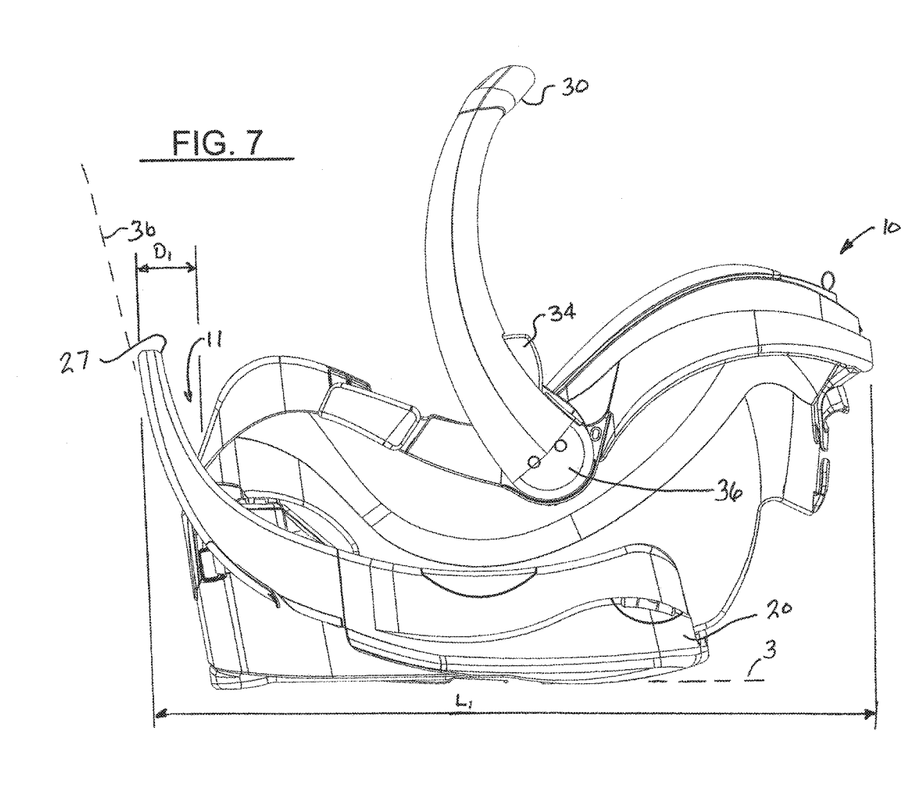
FIG. 7 is a side view of the safety seat assembly with the seat shell shown oriented in the normal inclination as shown in FIG. 1.
Figure 8:
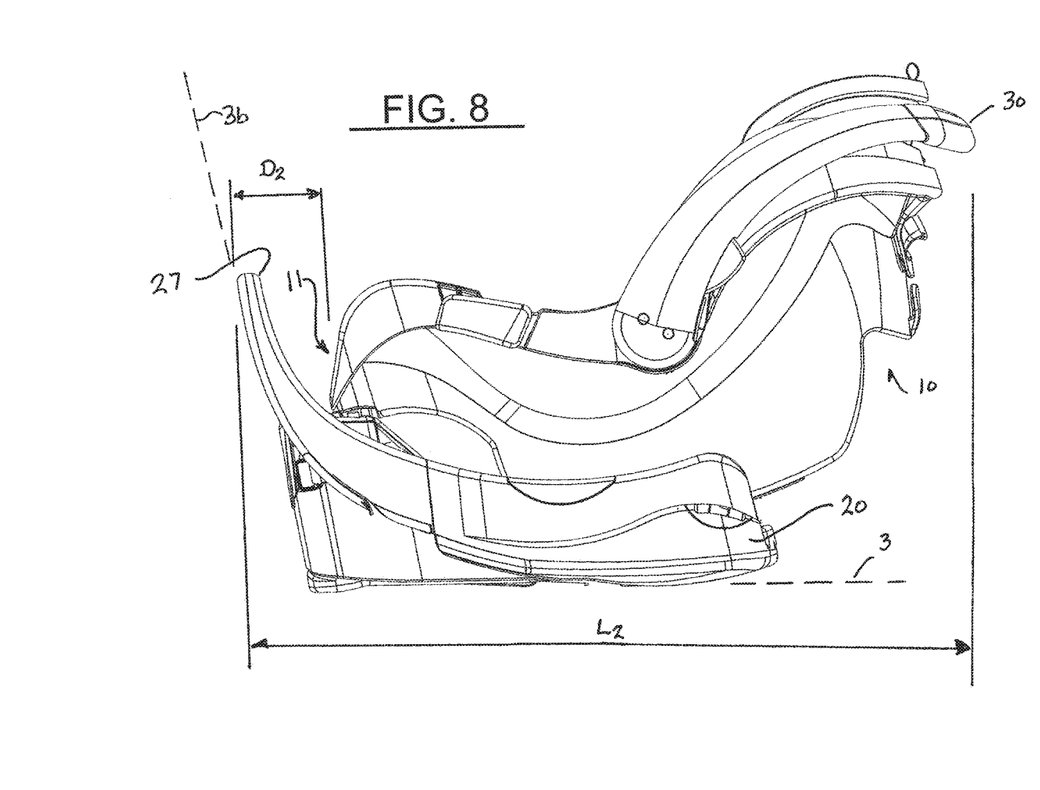
FIG. 8 is a side view of the safety seat assembly with the seat shell shown oriented in the upright inclination as shown in FIG. 2.

As is best illustrated in FIGS. 7 and 8, adjustment of the seat shell 10 position between the first (FIG. 7) and second (FIG. 8) positions maintains the overall envelope of the seat shell 10 within approximately the same front-rear envelope (shown as dimensions $L_1$ and $L_2$ in FIGS. 7 and 8, respectively) while increasing the available leg room (measured from the forward seat edge 11 of the seat shell to the base end 27, dimension $D_1$ and $D_2$). By maintaining a similar front-rear envelope (the values of $L_1$ and $L_2$ are generally equal), the safety seat assembly 5 can be repositioned when installed in a rear vehicle seat 3 without adversely affecting clearance between the seat shell 10 and the rear surface of the vehicle front seat (not shown). The seat shell position in the second position (FIG. 8) also provides increased space between the forward seat edge 11 of the shell 10 and vehicle seat back 3b in which the seat assembly is mounted and base end 27 for increased ($D_2$ is greater than $D_1$) comfort when toddlers and larger children occupy the safety seat 5.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A multi-position child safety seat assembly comprising:
   a seat shell having an interior seating area with a seating surface, a forward seat end, a backrest portion generally upwardly angled from the seating surface, and an external surface opposite of the interior seating area having at least two separate support structures disposed thereon;
   a seat base having a lower surface configured to support the seat assembly on a surface and a generally opposing upper surface configured to receive the external surface of the seat shell; and
   a movable positioning block connected to the upper surface, the positioning block being movable between generally inverted first and second positions, the block contacting one of the support structures when the positioning block is in the first position, and the positioning block contacting the other of the support structures when the positioning block is in the second position as the seat shell is received in the upper surface, interaction of the positioning block and at least one of the support structures guiding the seat shell into one of two positions relative to the seat base dependent upon whether the block is in the first position or the second position.

2. The seat assembly of claim 1, wherein the upper surface is configured to engage the external surface of the seat shell and inhibit lateral movement of the seat shell relative to the seat base.

3. The seat assembly of claim 2, further comprising a retention mechanism having a first latch configured to engaged a first receptacle or a second receptacle to retain the seat shell connected to the seat base, the first and second receptacle being engaged dependent upon whether the block is in the first position or the second position, respectively.

4. The seat assembly of claim 3, wherein the retention mechanism further comprises a second latch configured to engage a third receptacle or a fourth receptacle.

5. The seat assembly of claim 4, wherein the first latch and the third and fourth receptacles are disposed on the seat shell, and the second latch and the first and second receptacles are disposed on the seat base.

6. The seat assembly of claim 3, wherein at least one of the support structures comprises a pair of spaced-apart, convexly curved support structures extending generally fore and aft along the lower surface.

7. The seat assembly of claim 6, wherein the movable block is hingedly connected to the upper surface and movable about a generally transverse axis.

8. The seat assembly of claim 7, wherein the support structures comprise at least one positioner engagable by the movable block, the movable block having a first surface configured to matingly engage the at least one positioner to guide the seat shell into the first or the second position dependent upon the position of the movable block, and retain the seat shell generally fixed in relation to the seat base when the retention mechanism is engaged.

9. The seat assembly of claim 8, wherein the at least one positioner includes a positioner engagable by the movable block whether the block is the first position or the second position.

10. The seat assembly of claim 1, wherein the backrest portion is more uprightly angled when the seat shell is received and the positioning block is in the second position than when the seat shell is received and the positioning block is in the first position.

11. A multi-position child safety seat assembly comprising:
a seat shell having an interior seating area with a seating surface, a forward seat end, a backrest portion generally upwardly angled from the seating surface, and an external surface opposite of the interior seating area having at least two separate support structures disposed thereon;
a seat base having a lower surface configured to support the seat assembly on a surface, a generally opposing upper surface configured to receive the external surface of the seat shell, and a base end; and
a movable positioning block connected to the upper surface, the positioning block being movable between generally inverted first and second positions, the block contacting at least one of the support structure as the seat shell is received in the upper structures when the positioning block is in the first position, and the positioning block contacting the other of the support structures when the positioning block is in the second position, interaction of the positioning block and at least one of the support structures guiding the seat shell into one of two positions relative to the seat base dependent upon whether the block is in the first position or the second position wherein the space between the forward seat end and the base end is increased when the seat is received and the block is in the second position.

12. The seat assembly of claim 11, wherein the backrest portion is more uprightly angled when the positioning block is in the second position than when in the first position.

13. The seat assembly of claim 12, wherein the upper surface is configured to engage the external surface of the seat shell and inhibit lateral movement of the seat shell relative to the seat base.

14. The seat assembly of claim 13, further comprising a retention mechanism having a first latch configured to engaged a first receptacle or a second receptacle to retain the seat shell connected to the seat base, the first or second receptacle being engaged dependent upon whether the block is in the first position or the second position, respectively.

15. The seat assembly of claim 14, wherein at least one of the support structures comprises a pair of spaced-apart, convexly curved support structures extending generally fore and aft along the lower surface.

16. The seat assembly of claim 15, wherein the movable block is hingedly connected to the upper surface and movable about a generally transverse axis.

17. The seat assembly of claim 16, wherein the support structures comprise at least one positioner engagable by the movable block, the movable block having a first surface configured to matingly engage the at least one positioner to guide the seat shell into the first or the second position dependent upon the position of the movable block, and retain the seat shell generally fixed in relation to the seat base when the retention mechanism is engaged.

18. The seat assembly of claim 17, wherein the at least one positioner includes a positioner engagable by the movable block whether the block is the first position or the second position.

19. The seat assembly of claim 14, wherein the retention mechanism further comprises a second latch configured to engage a third receptacle or a fourth receptacle.

20. The seat assembly of claim 19, wherein the first latch and the third and fourth receptacles are disposed on the seat shell, and the second latch and the first and second receptacles are disposed on the seat base.

* * * * *